United States Patent [19]
O'Meara

[11] Patent Number: 4,579,158
[45] Date of Patent: Apr. 1, 1986

[54] WORK SUPPORT JIG AND METHOD OF MAKING ROUTERED COMPONENTS

[76] Inventor: Donald K. O'Meara, 2631 Nebraska St., Dubuque, Iowa 52001

[21] Appl. No.: 628,932

[22] Filed: Jul. 9, 1984

[51] Int. Cl.$^4$ .............................................. B27C 5/10
[52] U.S. Cl. ...................... 144/144 R; 144/144.5 R; 144/372; 144/137; 409/97; 409/124; 409/130
[58] Field of Search ............... 409/97, 110, 124, 130, 409/178; 144/144 R, 144.5, 372, 137

[56] References Cited

U.S. PATENT DOCUMENTS

| | | | |
|---|---|---|---|
| 2,427,081 | 9/1947 | Zern | 144/144.5 |
| 3,301,288 | 1/1967 | Norlie et al. | 144/144 R |
| 4,373,562 | 2/1983 | Vernon | 409/130 |

FOREIGN PATENT DOCUMENTS 1169812  5/1964  Fed. Rep. of Germany ... 144/144 R

Primary Examiner—W. D. Bray
Attorney, Agent, or Firm—Dowell & Dowell

[57] ABSTRACT

A pneumatically operated work support jig which selectively retains a workpiece in an aligned relationship with a template having at least one tool guiding slot therein so that the workpiece may be formed into a predetermined shape by a routing or other cutting tool which is positioned within and guided by the slot in the template. The jig or press is particularly adapted for use in a method of forming end splashes or vertical dividers for counter tops.

6 Claims, 7 Drawing Figures

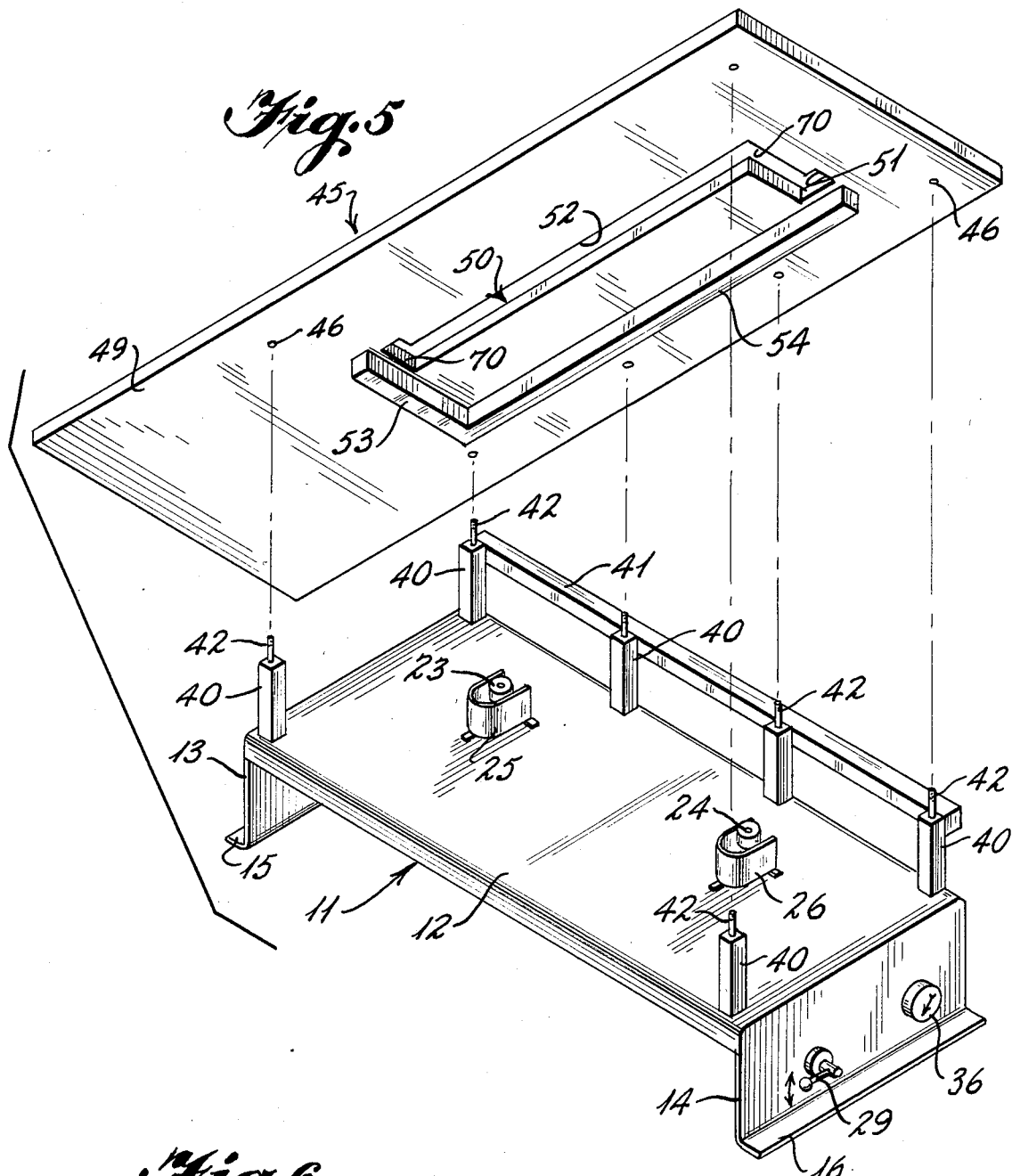
Fig. 5
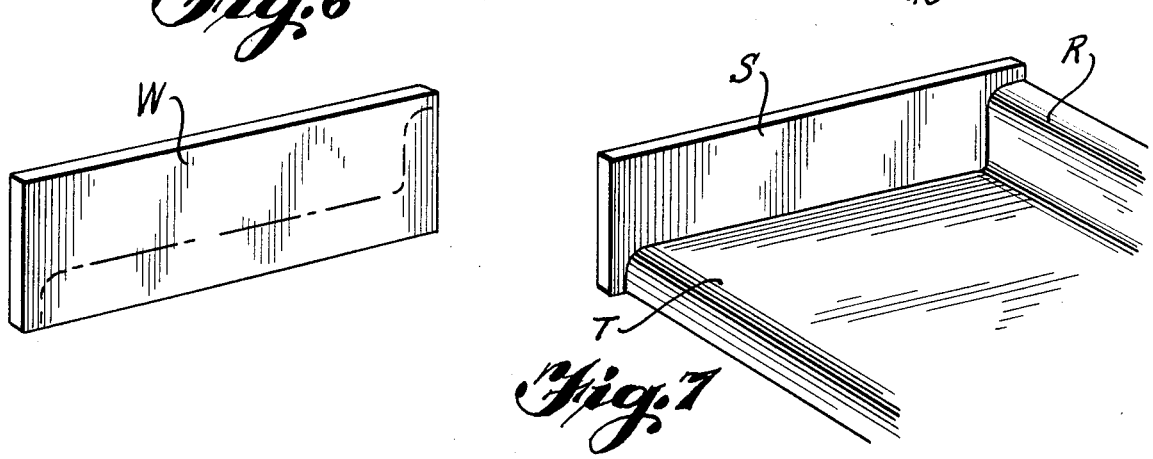
Fig. 6
Fig. 7

WORK SUPPORT JIG AND METHOD OF MAKING ROUTERED COMPONENTS

BACKGROUND OF THE INVENTION

1. Field of the Invention

This invention is generally related to work support benches and machinery for securely holding a workpiece in a position where the workpiece may be formed with a cutting tool and specifically to a pneumatically operated press or jig for selectively urging and retaining a workpiece against the underside of a cutting tool guide template after the workpiece has been properly aligned against a guide frame mounted on the template. After the workpiece has been placed and retained within the jig, a router or similar cutting tool is guided by slots in the template so as to follow a predesignated path to thereby cut the workpiece to form an article having a specifically predetermined configuration. The jig is particularly adapted for use in a method of forming curved, square or rounded vertically oriented splash plates for mounting to laminated counter tops.

2. History of the Prior Art

Heretofore, cabinet makers and carpenters have had to rely on hand forming techniques to shape end splash units for counter tops and the like. The end splash units are designed to extend vertically with respect to the surface of a counter top so as to provide a barrier to prevent liquids or articles on the counter tops from spilling or being accidentally forced off the edge of the counter. The hand forming of end splash units is particularly difficult and time consuming especially in those instances where the counter top is rounded or shaped so as to form a curved lip which extends along the front portion thereof so as to provide a barrier to prevent liquid from running over the front edge of the counter top.

There are numerous Workpiece holding benches and guides which are available to the craftsman. In Klein U.S. Pat. No. 4,102,374, a jig and template apparatus is disclosed for cutting and inserting a diagonal corner in a laminated plastic counter top. This apparatus permits a cutting tool to be guided by the edges of a template which is formed by adjustable frame members. The template is retained against the counter top by pneumatically operated pistons. The work to be performed using the jig and template is specific to forming a particular diagonal section in a counter top so as to permit a rotatable cabinet to be installed thereunder. The apparatus, however, is somewhat complex and bulky and the template must be adjusted for each use.

In Mericle U.S. Pat. No. 4,230,164, a nested template is disclosed which provides a series of slots for guiding a cutting tool over a workpiece to thereby form a plurality of concentric frame elements. The template, however, incorporates a plurality of bands which must each be screwed into engagement with the workpiece. Thus, the use of the templates is for cutting specific articles and necessitate a great deal of time and effort to mount and align the template bands relative to the work surface.

There are other prior art jig and template structures which are uniquely designed to permit a specific function to be performed on a workpiece. Many such structures, however, require complex supports and guides for aligning workpieces with the cutting or shaping tools. In some instances, the tools must be affixed to the apparatus to permit proper cutting and/or shaping alignment.

Some other examples of prior art jig and work support structures include Tesar et al. U.S. Pat. No. 3,095,915, Norlie, et al. U.S. Pat. No. 3,301,288, Kualheim et al. U.S. Pat. No. 3,344,827, and Okey U.S. Pat. No. 3,468,353.

SUMMARY OF THE INVENTION

This invention is directed to a pneumatic jig and template apparatus for holding workpieces so as to permit predetermined shapes to be cut from the workpiece wherein the apparatus includes a support frame to which a pair of pneumatic cylinder presses are mounted so as to be in underlying relationship with the template which is secured to the base and spaced from the presses by upstanding mounting pedestals. The lower surface of the template includes a generally L-shaped workpiece orienting flange which insures proper alignment of a workpiece relative to an elongated generally Z-shaped slot through the template along which a cutting tool may be selectively guided so as to form a workpiece which is retained against the lower surface of the template by the pneumatic presses.

It is the primary object of this invention to provide a pneumatically operated jig and template apparatus for forming end splash units for mounting to counter tops so as to provide a vertical barrier thereon which apparatus is easily operated and permits numerous end splashes to be accurately formed to standardized predetermined specifications.

It is yet another object of the present invention to provide a workpiece supporting jig or press which securely aligns the workpiece with the under surface of a forming template so that the resultant product to be formed from the workpiece will be accurately cut by a tool which is positively guided by at least one slot provided through the template.

It is a further object of the present invention to provide a method for forming end splash units for counter tops which end splashes may be curved, square or rounded and which are formed out of a particle board material having a plastic laminate finish.

BRIEF DESCRIPTION OF THE DRAWINGS

FIG. 5 is a perspective assembly view of the base and template portions of the apparatus of the present invention.

FIG. 6 is a perspective view of a workpiece to be supported and retained by the apparatus of the present invention as it is formed into an end splash unit (as shown in dotted line).

FIG. 7 is an illustrational view showing an end splash unit formed using the apparatus of the present invention as it is mounted to a conventional laminated counter top.

DESCRIPTION OF THE PREFERRED EMBODIMENT

Figure 1:
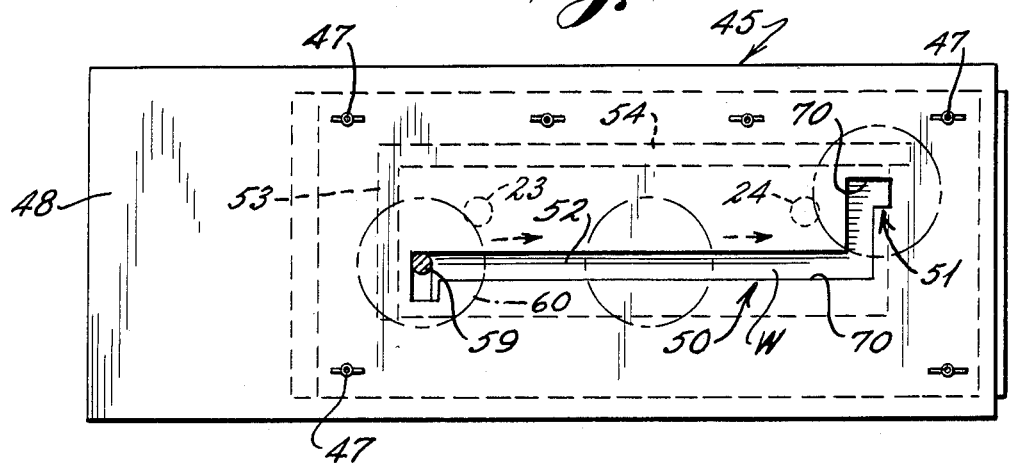
FIG. 1 is a top plan view of the work supporting jig and forming template of the present invention showing an illustration of the movement of a work forming tool such as a router in respective dotted line positions.
Figure 2:
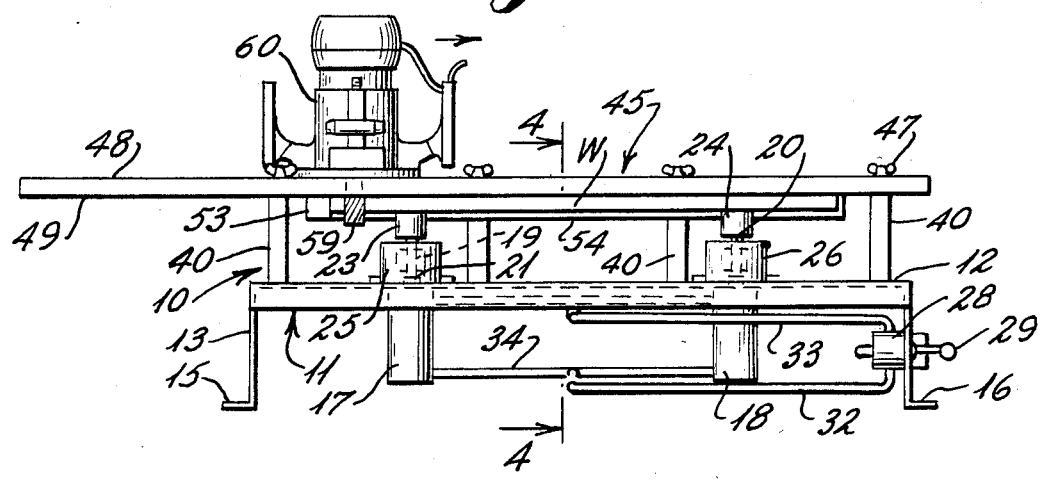
FIG. 2 is a front elevational view of the work supporting jig and forming template of the present invention.
Figure 3:
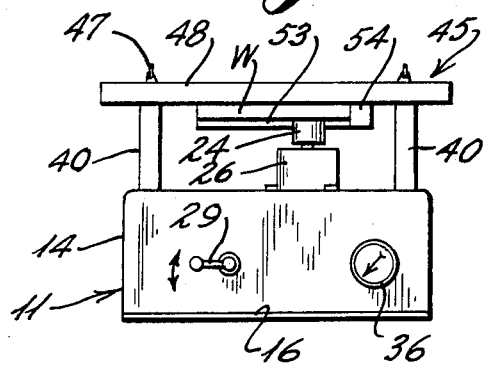
FIG. 3 is a side view taken from the right of the work supporting jig and forming template of FIG. 2.
Figure 4:
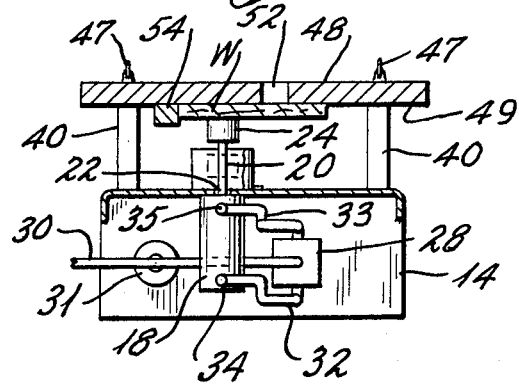
FIG. 4 is a cross-sectional view taken along lines 4—4 of FIG. 2.

With continued reference to the drawings, the present invention is embodied in a workpiece supporting jig 10 having a base portion 11 which consists of a generally horizontally oriented shelf 12 which is supported in elevated relationship to a support surface such as a workbench by downwardly extending side flanges 13 and 14. The flanges terminate in foot stabilizing portions 15 and 16 respectively. Although the base is shown as being bench or table mounted, the side flanges could be extended or supported by legs (not shown) so as to permit the jig to be floor supported.

Mounted on the underside of the shelf 12 of the base are a pair of pneumatic cylinders 17 and 18. The pneumatic cylinders 17 and 18 have cylinder arms 19 and 20, respectively, which extend upwardly through openings 21 and 22 through the shelf 12. The pneumatic cylinder arm 19 and 20 are vertically adjustable above the shelf 12 and are capped at their outmost ends with rubber pads 23 and 24. Safety sleeves 25 and 26 are placed substantially around the cylinder arms 19 and 20 and are welded or otherwise secured to the base shelf 12. The safety sleeves not only help prevent dirt and debris from falling into the upper ends of the pneumatic cylinder, but also prevent hands and other objects from accidental injury or being trapped by the cylinder pads as the cylinder arms are being withdrawn into the body of the pneumatic cylinder.

The operation of the pneumatic cylinders is controlled by a two-way air control valve 28 having an operating "raise and lower" handle 29. The control valve and handle are mounted to the side flange 14 and permit ready access to control of the pneumatic cylinder. A source of air supply (not shown) is connected to the control valve 28 by an air inlet hose 30 which extends to an air regulator 31. Air passes to the pneumatic cylinders via pressure hoses 32 and 33 which communicate with cylinder inlet hoses 34 and 35. It should be noted that the hoses 32 and 33 are connected at the mid point of the cylinder hoses 34 and 35 so that the pneumatic cylinders will receive a balanced fluid pressure thereby enabling their operation to be synchronized. As shown, movement of the operating handle to a raised position will cause air to pass through lines 32 and 34 to raise the cylinder arms while turning the handle to a lower position will permit air to flow through lines 33 and 35 thereby lowering the cylinder arms. A pressure gauge 36 may be positioned on the side flange 14 so as to give the operator the pressure reading at the air pressure regulator 31.

Also mounted to the shelf portion 12 of the jig base are a plurality of vertically extending spacing studs or columns 40. As shown in FIG. 5, four studs are mounted along the rear portion of the base while only two studs are provided adjacent either of the front corners of the base shelf. In this manner, there is no obstruction between the front studs which would otherwise prevent workpieces from passing therebetween into a position above the cylinder pads. The rear studs are joined by a reinforcing bar 41 which serves to strengthen and stabilize the studs. Screw threaded shafts 42 are carried within the studs and extend outwardly and axially from the upper ends thereof.

A workpiece guide and template 45 is removably mounted to the studs 40 and includes a plurality of openings 46 therein which are aligned to receive the screw threaded shafts 42 therethrough. The template is secured in place by a plurality of wing nuts 47 or other fastening means which engage the threaded shafts 42.

The template 45 is generally rectangular in configuration and includes upper and lower generally planar surfaces 48 and 49. An elongated generally Z-shaped slot 50 is provided through and generally centrally of the template. The slot is continuously open and terminates in a short section 51 which extends from one end of the Z generally parallel with the central section 52 thereof.

With reference to FIG. 5, a pair of guide stops 53 and 54 are secured to the underside of the template so as to form a generally L-shaped configuration which extends outwardly along two sides of the slot 50. The guide stops serve to align a workpiece W relative to the slot 50 so that the cutting element 59 of a tool such as a router 60 can be used to cut or reshape the workpiece W as the cutting element is urged along the slot as shown in FIG. 1.

As shown, the template not only provides a generally planar working surface, but the slot therein provides a positive guide for directing the movement of a cutting or shaping tool. The templates may be constructed of wood or metal and can easily be removed or replaced by a different template. The guide stops are particularly oriented along the lower surface thereof to insure proper alignment of workpieces with the cutting guide slot.

As previously discussed, the jig and template of the present invention are particularly advantageous for forming end splashes S for counter tops T. With particular reference to FIG. 6, a generally rectangular workpiece W is shown before it is placed within the jig and cut to form a shaped end splash unit S. The completed end splash is shown as it is mounted for use with a counter top T in FIG. 7. The line of cut along the workpiece is shown in dotted lines in FIG. 6. The cutting element of a router tool will follow this cutting line as the cutting element is moved along the guide slot in the template. The rounded corners are achieved by the guiding cooperation between the squared corners 70 of the groove and the generally circular cutting element of the router. As shown in FIG. 7, the resultant end splash S is cut so as to cooperatively be seated against the upper surface and rear splash plate R of the counter top. Changes in counter top contour can be compensated for by slightly changing the configuration of the guide slot 50.

In order to use the jig of the present invention to form an end splash S for a counter top T, the width and height of the counter top is measured and approximately ¼ inch is added to each dimension. A rectangular workpiece W of ¾ inch particle board is cut to a size equal to the measured and added dimensions after which one side, top and both ends are laminated with a plastic material.

If it is desired to form a left end splash unit, the laminated workpiece is inserted into the jig above the rubber cylinder pads with the lamination face up and urged against the stops 53 and 54. The pneumatic cylinders are then operated to cause the pads to force the workpiece against the bottom of the template. Thereafter, a routing cutter bit is placed at the left end of the slot in the template and the cut is made to the right (as shown by the arrows in FIG. 1). After the routing is completed, the pneumatic cylinders are activated to retract the pads from the template and the completed end splash is removed. If it is desired to form a right end splash unit, the above procedure is followed except that the laminated workpiece is inserted into the jig with the laminated side down.

I claim:

1. A work supporting apparatus comprising a jig means having a base, pneumatic cylinder means mounted to said base, said pneumatic cylinder means having an extendable arm, means for selectively operating said pneumatic cylinder means so as to extend and retract said extendable arm, support means mounted to said base of said jig means and extending upwardly therefrom to their upper ends, template means removably mounted to said upper ends of said support means, said template means having upper and lower generally planar surfaces, an elongated shaped slot formed through said template means, a guide stop means mounted to said lower surface of said template means adjacent said slot whereby a workpiece can be selectively aligned against said guide stop means and retained in flush engagement with the lower surface of said template by said extendable arm of said pneumatic cylinder means so that a tool can be guided along said elongated shaped slot to cut the workpiece.

2. The work supporting apparatus of claim 1 in which said cylinder arm means includes an upper end, and pad means secured to said upper end of said arm means.

3. The work supporting apparatus of claim 2 including a pair of cylinder means mounted in spaced relationship relative to one another on said base, said pair of cylinder means being simultaneously and similarly activated by said means for selectively operating said pneumatic cylinder means.

4. The work supporting apparatus of claim 3 including sleeve means mounted to said base and at least partially surrounding each of said extendable arm means of said pneumatic cylinder means.

5. The work supporting apparatus of claim 1 in which said elongated shaped slot is generally Z-shaped having an elongated central portion and generally parallel portions extending from either end of said central portion and a right angled portion extending from the end of one of said parallel portions so as to be oriented generally parallel to and extending away from said central portion of said slot.

6. The work supporting apparatus of claim 5 in which said guide stop means is generally L-shaped having first and second leg portions which are oriented generally perpendicularly to one another, said first leg portion extending generally parallel to one of said generally parallel portions of said slot and said second leg portion extending generally parallel to said central portion of said slot.

* * * * *